United States Patent [19]
Horihata

[11] Patent Number: 4,745,416
[45] Date of Patent: May 17, 1988

[54] LASER BEAM PRINTER WITH OPTICAL SYSTEM FOR PREVENTING GHOST IMAGES

[75] Inventor: Katsushi Horihata, Osaka, Japan

[73] Assignee: Mita Industrial Co., Ltd., Osaka, Japan

[21] Appl. No.: 19,354

[22] Filed: Feb. 26, 1987

[30] Foreign Application Priority Data

Feb. 28, 1986 [JP] Japan ................................. 61-44999

[51] Int. Cl.[4] ..................... G01D 9/42; G01D 15/14; H04N 1/21
[52] U.S. Cl. .................................. 346/108; 346/160; 358/296
[58] Field of Search ................. 346/108, 76 L, 107 R, 346/160; 358/296

[56] References Cited

U.S. PATENT DOCUMENTS

| | | | |
|---|---|---|---|
| 4,171,902 | 10/1979 | Imai et al. | 355/11 |
| 4,209,793 | 6/1980 | Ueno | 346/108 |
| 4,469,430 | 9/1984 | Terashima | 355/3 R |
| 4,630,070 | 12/1986 | Sato | 346/108 |

*Primary Examiner*—E. A. Goldberg
*Assistant Examiner*—Mark Reinhart
*Attorney, Agent, or Firm*—Stiefel, Gross & Kurland

[57] ABSTRACT

The present invention provides a laser beam printer which comprises a beam source for emitting a beam corresponding to an image signal, a photosensitive member for forming an electrostatic latent image thereon with the beam, a polygon mirror for reflecting the beam emitted by the beam source to scan the photosensitive member with the beam, an image forming lens provided between the polygon mirror and the photosensitive member in the optical path of the mirror for focusing the reflected beam from the polygon mirror on the surface of the photosensitive member, a box accommodating the beam source, the polygon mirror and the image forming lens therein and having a window for passing therethrough the beam from the image forming lens toward the photosensitive member, an optical filter provided over the opening of the window, and light blocking means disposed in an optical path along which a portion of the beam reflected from one of the mirror faces of the polygon mirror travels toward the image forming lens again after the beam portion reversely travels through the image forming lens upon reflection at the surface of the filter and is reflected from another mirror face adjacent to said one mirror face.

This arrangement precludes the ghost image to be otherwise formed by the beam portion reflected from the filter surface.

7 Claims, 4 Drawing Sheets

LASER BEAM PRINTER WITH OPTICAL SYSTEM FOR PREVENTING GHOST IMAGES

BACKGROUND OF THE INVENTION

1. Field of the Invention

The present invention relates to a laser beam printer for forming a copy image on a photosensitive member with a laser beam and transferring the image onto record paper.

2. Description of the Prior Art

Conventionally, such laser beam printers primarily comprise an optical system for emitting an image forming beam, a photosensitive member for forming an electrostatic latent image thereon with the beam and a developing system for developing the latent image. A partition wall is interposed between the optical system and the developing system for preventing the optical system from contamination with dust or the developer spilling from the developing system. The laser beam from the optical system impinges on the photosensitive member in the developing system through a dust filter provided on a window of the partition wall to form images on the member (see, for example, U.S. Pat. No. 4,469,430).

An optical filter, e.g. a transparent glass plate, is used as the dust filter since such a filter is simple in construction, easy to install and also easy to clean or replace when soiled.

However, the use of the optical filter involves the problem that the laser beam passing through the filter is partly reflected from the surface of the filter and then reflected from a polygon mirror again to form a ghost image on the photosensitive member.

U.S. Pat. No. 4,171,902, for example, discloses a technique for removing ghost images, but this prior-art technique is intended to remove a ghost image attributable to the light reflected from the photosensitive member and is not adapted to remove the ghost image to be formed by the light reflected from the surface of the above-mentioned optical filter.

SUMMARY OF THE INVENTION

The present invention provides a laser beam printer which comprises a beam source for emitting a beam corresponding to an image signal, a photosensitive member for forming an electrostatic latent image thereon with the beam, a polygon mirror for reflecting the beam emitted by the beam source to scan the photosensitive member with the beam, an image forming lens provided between the polygon mirror and the photosensitive member in the optical path of the mirror for focusing the reflected beam from the polygon mirror on the surface of the photosensitive member, a box accommodating the beam source, the polygon mirror and the image forming lens therein and having a window for passing therethrough the beam from the image forming lens toward the photosensitive member, an optical filter provided over the opening of the window, and light blocking means disposed in an optical path along which a portion of the beam reflected from one of the mirror faces of the polygon mirror travels toward the image forming lens again after the beam portion reversely travels through the image forming lens upon reflection at the surface of the filter and is reflected from another mirror face adjacent to said one mirror face.

Preferably, the light blocking means is disposed at one end of the image forming lens at one side of the optical axis of the lens opposite to the other side thereof where the beam from the beam source is incident on the polygon mirror, is positioned in the vicinity of the surface of the image forming lens opposed to the polygon mirror and is at a specified distance from the optical axis.

This arrangement precludes the ghost image to be otherwise formed by the beam portion reflected from the filter surface.

DESCRIPTION OF THE PREFERRED EMBODIMENTS

Figure 1:
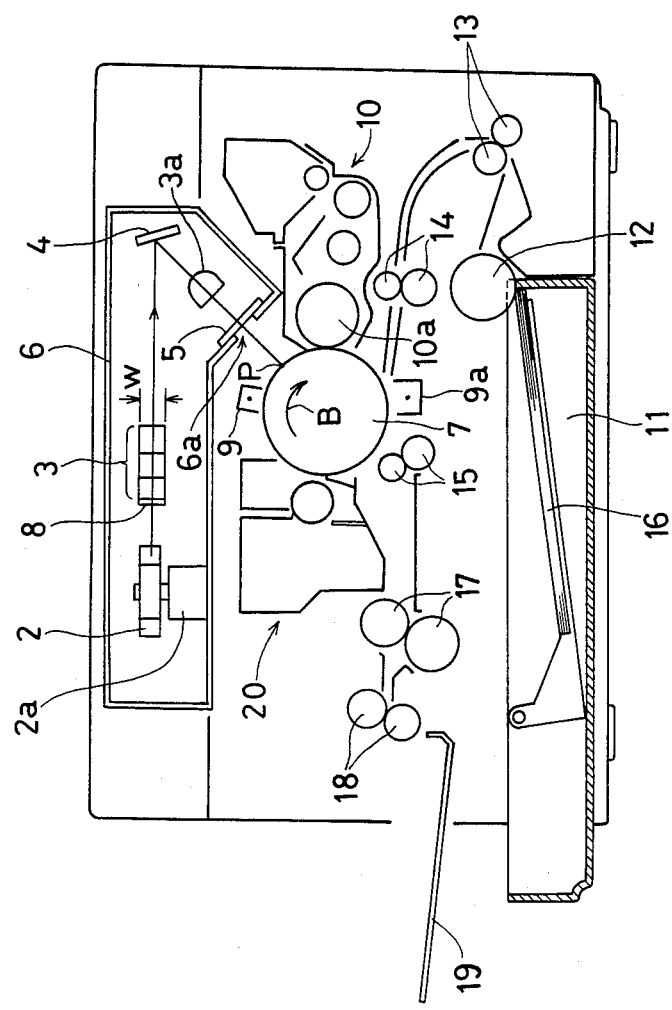
FIG. 1 is a diagram showing the construction of an embodiment of the present invention.
Figure 2:
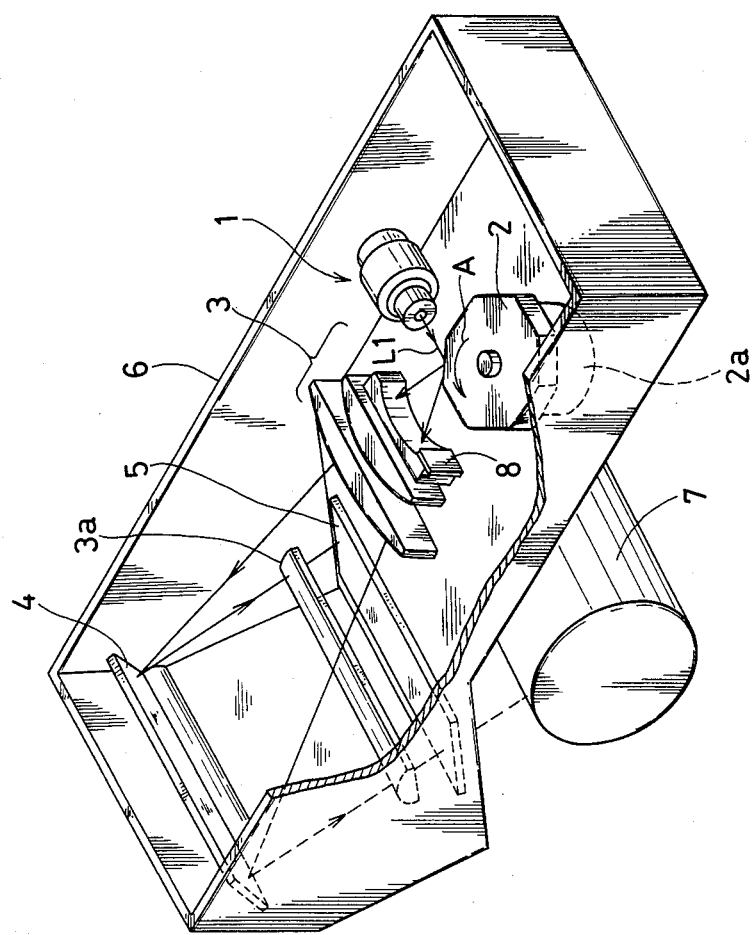
FIG. 2 is a perspective view showing an optical system included in the embodiment.

FIG. 1 schematically shows the overall construction of a laser beam printer embodying the invention, and FIG. 2 is a perspective view showing the optical system illustrated in FIG. 1. These drawings show a laser beam source 1 comprising a semiconductor laser, a collimator lens and a prism for emitting a laser beam corresponding to an input image signal, a polygon mirror 2 for reflecting the beam from the beam source 1 with a plurality of mirror faces, a motor 2a for rotating the polygon mirror 2 in the direction of arrow A at a predetermined speed, an image forming lens 3 for correcting the distortion of the beam reflected from the polygon mirror 2, a plane mirror 4 for reflecting the beam passing through the image forming lens 3, a cylindrical lens 3a for transmitting therethrough the beam reflected from the plane mirror 4 to correct variations in the beam focused position which result from variations in the angle of inclination of the faces of the polygon mirror 2, a box 6 accommodating therein the optical elements such as the polygon mirror 2, image forming lens 3, plane mirror 4 and cylindrical lens 3a and having a window 6a for passing therethrough the beam reflected from the plane mirror 4, a filter 5 provided over the opening of the window 6a, a light blocking plate 8 disposed in the vicinity of the image forming lens 3, a photosensitive drum 7, a corona charger 9 for uniformly charging the surface of the drum 7, a developing unit 10 comprising a developing roller 10a for feeding a developer to the surface of the drum 7, a cassette 11 containing record paper 16, a feed roller 12 for dispensing the paper from the cassette 11, a pair of transport rollers 13 for transporting the record paper, resist rollers 14 for intermittently forwarding the record paper toward the drum 7 with predetermined timing, a transfer corona charger 9a for charging by corona discharge the record paper delivered from the resist rollers 14 to transfer a developed image from the drum 7 to the surface of the record paper, a pair of separating rollers 15 for separating from the drum 7 the paper having the transferred image thereon, a pair of fixing rollers 17 for heat-fixing the transferred image to the paper, discharge rollers 18 for delivering the record paper from the printer after the fixing, a tray 19 for receiving the delivered record paper, and a cleaning unit 20 for cleaning the surface of the drum 7 after the image transfer.

The image forming lens 3 used is an f·θ lens which is generally employed. This lens is so designed that a beam incident on the lens at an angle θ with its optical axis is focused on a screen away from the lens by the focal distance f of the lens, at a position f·θ away from the optical axis.

The polygon mirror 2 used is generally in the form of a regular hexagon or regular polygon having a larger number of sides.

The light blocking plate 8 has a width W (FIG. 1) greater than the thickness of the image forming lens 3 and such a length as to cover the lens surface from one end of the lens 3 to a position a specified distance away from the optical axis as will be described later. The plate 8 is made of a material capable of blocking the laser beam, such as aluminum, iron, or like metal or opaque plastics.

While the filter 5 is made of a usual transparent glass plate, it is desirable to mount the filter 5 removably on the box 6 to assure ease of cleaning or replacement.

A description will be given of the overall operation of the laser printer having the above construction.

When a laser beam L1 corresponding to an image signal is emitted by the laser beam source 1 (FIG. 2), the beam L1 is reflected from the rotating polygon mirror 2 and forms an image at point P on the surface of the photosensitive drum 7 via the image forming lens 3, plane mirror 4, cylindrical lens 3a and filter 5. Thus, the surface of the drum 7 uniformly sensitized by the charging corona charger 9 and rotating in the direction of arrow B is scanned by the beam L1, whereby an electrostatic latent image is formed on the drum surface. The latent image is converted to a visible image with a developer applied thereto by the developing roller 10a. A sheet of record paper 16 accommodated in the cassette 11 is sent out by the feed roller 12, transported by the transport rollers 13 and temporarily halted when the leading end of the paper 16 reaches the resist rollers 14. The resist rollers 14 operate in timed relation with the progress of development of the image on the drum 7, whereupon the record paper is brought to a position under the drum 7 into contact with the visible image bearing portion thereof by the resist rollers 14. The paper is charged on the rear side thereof by the transfer corona charger 9a, whereby the developer forming the visible image on the drum surface is transferred to the record paper. The record paper, now bearing the transferred image, is separated from the drum 7 by the separating rollers 15 and fed to the fixing rollers 17, which thermally fix the visible image to the paper. The print is then delivered onto the tray 19 by the discharge rollers 18, whereby a printing cylce is completed for the sheet of record paper. After the image transfer, the surface of the drum 7 is cleaned by the cleaning unit 20 and made ready for the next printing cycle.

Figure 3:
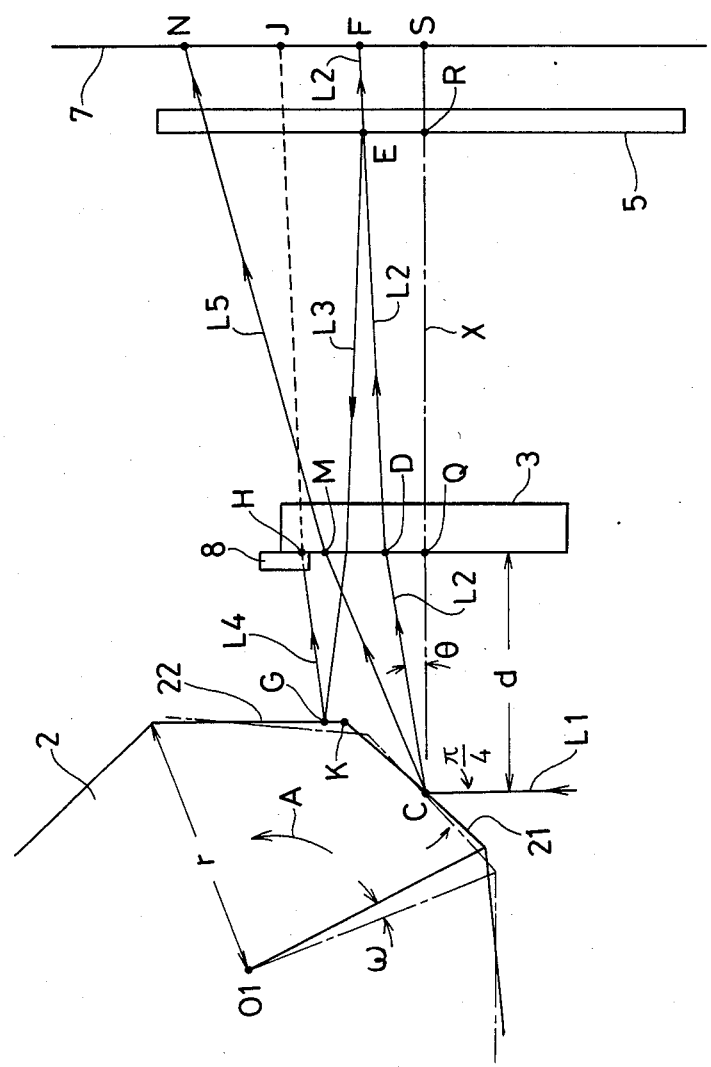
FIG. 3 is a diagram showing the arrangement and operation of the optical system.

FIG. 3 is a diagram showing the arrangement of some of the optical elements shown in FIG. 2, as related to their operation. With reference to FIG. 3, the polygon mirror 2, which is circumscribed by a circle with a radius r, rotates about its center 01 in the direction of arrow A. The polygon mirror 2 is at a distance d from the image forming lens (illustrated as simplified) 3 so that when the beam L1 emanating from the beam source 1 (FIG. 2) is incident on the center of one of the mirror 2 at an angle of π/4 rad, the reflected beam is in alignment with the optical axis of the image forming lens 3. The photosensitive drum 7 is so disposed that the surface thereof is at an optical distance of f (focal distance of the image forming lens 3) from the lens 3. Further the filter 5 is positioned sufficiently close to the surface of the drum 7 although it is a substantial distance away from the image forming lens 3, and is positioned perpendicular to the optical axis X to preclude the influence of its refractive index on the beam.

The light blocking plate 8 must be provided in an optical path along which a portion of the beam L2 reflected from the mirror face 21 of the polygon mirror 2 travels toward the image forming lens 3 again after the beam portion reversely travels through the lens 3 upon reflection at the surface of the filter 5 and is reflected as indicated at L4 from another mirror face 22 adjacent to the mirror face 21. According to the present embodiment, therefore, the light blocking plate 8 is disposed at one end of the image forming lens 3 at one side of the optical axis X opposite to the other side thereof where the beam L1 from the beam source 1 is incident on the polygon mirror 2, is positioned in the vicinity of the surface of the image forming lens 3 opposed to the polygon mirror 2 and is at a specified distance from the optical axis X.

In this arrangement of the optical elements, the beam L1 emanating from the beam source 1 is first incident on the mirror face 21 of the polygon mirror 2 at the angle π/4. When the polygon mirror 2 rotates through an angle ω from this angular position, the beam L1 is reflected at point C, and the reflected beam indicated at L2 impinges at an angle θ (=2ω) on the image forming lens 3 at point D. The beam L2 then passes through the filter 5 and converges at point F on the surface of the photosensitive drum 7. However, the beam L2 is partially reflected at point E on the surface of the filter 5, so that the reflected beam L3 reversely proceeds through the lens 3 toward the polygon mirror 2. Upon impinging on the mirror face 22, the beam L3 is reflected at point G on the mirror face 22 as indicated at L4. The beam L4 would be incident on the image forming lens 3 again at point H to form a ghost image at point J on the surface of the drum 7. Nevertheless, the reflected beam L4 is blocked by the light blocking plate 8 before impinging on the lens 3 and is therefore prevented from forming the ghost image. The beam L5 to be converged at point N on the drum 7 corresponding to the maximum width of printing impinges on the lens 3 at point M closer to the optical axis X than point H upon reflection from the mirror face 21 when the polygon mirror 2 further rotates. Accordingly, there is no likelihood that this beam will be blocked by the plate 8. Furthermore, the reverse beam L3, if incident on the mirror face 21, is reflected in a direction approximately parallel to the beam L1 emitted from the beam source. Thus, the reverse beam will in no way impinge on the image forming lens 3 again.

We have found that the aforementioned specified distance from the optical axis X to the light blocking plate 8 can be calculated as Hy of the following equation from the distance $\overline{HQ}$ between the optical axis X and the point H where the light of the return beam is incident on the image forming lens 3 when reflected from the mirror face 22 of the polygon mirror 2 in the solid-line position in FIG. 3 as rotated through the angle from its initial angular position indicated in a dot-and-dash line in FIG. 3.

$$Hy \leqq 2f \cdot \theta - r \cdot \tan \theta \left[ \cos\left(\frac{\pi}{4} - \frac{\pi}{n} - \omega\right) - \right.$$

$$\left. \frac{1}{\sqrt{2}} \cos \frac{\pi}{n} \right] + d \tan\left(\frac{4\pi}{n} - \frac{\pi}{2} + \theta\right) -$$

$$r \left[ \cos\left(\frac{\pi}{4} - \frac{\pi}{n} - \omega\right) - \frac{1}{\sqrt{2}} \cos \frac{\pi}{n} \right].$$

$$\tan\left(\frac{4\pi}{n} - \frac{\pi}{2} + \theta\right)$$

wherein:

$\theta$ is a minimum value satisfying Gy $\geqq$ Ky wherein $$Gy = 2f\theta - r \tan \theta \left[ \cos\left(\frac{\pi}{4} - \frac{\pi}{n} - \omega\right) - \frac{1}{\sqrt{2}} \cos \frac{\pi}{n} \right], \text{ and}$$

$$Ky = \frac{r}{\sqrt{2}} \cos \frac{\pi}{n} - r\sin\left(\frac{\pi}{4} - \frac{\pi}{n} - \omega\right),$$

f: the focal distance of the f·$\theta$ lens for use as the image forming lens,
n: the number of mirror faces of the polygon mirror,
r: the radius of a circle circumscribing the polygon mirror,
d: the optical distance from the point of reflection on the polygon mirror to the scanning center of the f·$\theta$ lens, and
$\omega$: the angle of rotation of the polygon mirror (=$\theta$/2).

Further in the above calculation, $\overline{ER} \approx \overline{FS} = f\theta$.

Incidentally, the distance My ($\overline{MQ}$) from the optical axis X to the point M where the beam L5 focused on the point N corresponding to the maximum width of printing (scanning) is incident on the image forming lens 3 is expressed by the following equation when the distance $\overline{NS}$ from the optical axis X to the point N is Ny.

$$My = d \cdot \tan (Ny/f)$$

Accordingly, it is desirable to assure that the light blocking plate 8 is so positioned as not to block the light incident on the point M the position of which is defined by the above equation.

Now suppose n=6, r=23.1 mm, f=186.6 mm, d=20 mm, and 2Ny=216 mm (8.5 inches). Then, $\theta$=1.4 deg, Hy$\leqq$16.1 mm and My=13.1 mm. Therefore, the specified distance is set, for example, to 15 mm.

Figure 4:
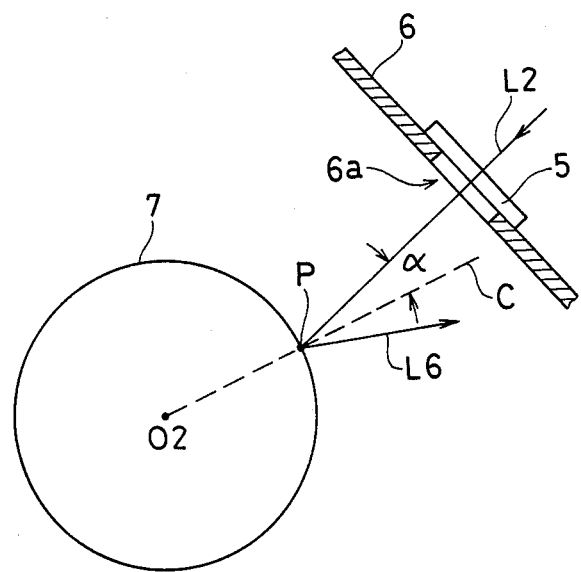
FIG. 4 is a diagram showing a beam impinging on a photosensitive member included in the embodiment.

FIG. 4 shows in detail a point P where the beam L2 forms an image on the photosensitive drum 7 shown in FIG. 1. With reference to FIG. 4, the beam L2 impinges on the point of image formation, P, through the opening of the window 6a provided with the filter 5. The drum 7 is so disposed that a normal (broken line) C through the center 02 of the drum and the point P is at an angle $\alpha$ of 6 deg. In other words, $\alpha$ is set to such an angle that even if the beam L2 is reflected at the surface of the drum 7, the reflected light L6 will not enter the opening of the window 6a. Accordingly, even if the beam L2 passing through the filter 5 is reflected from the drum 7, the reflected light L6 is blocked by the wall of the box 6, consequently forming no ghost image on the drum 7.

Figure 5:
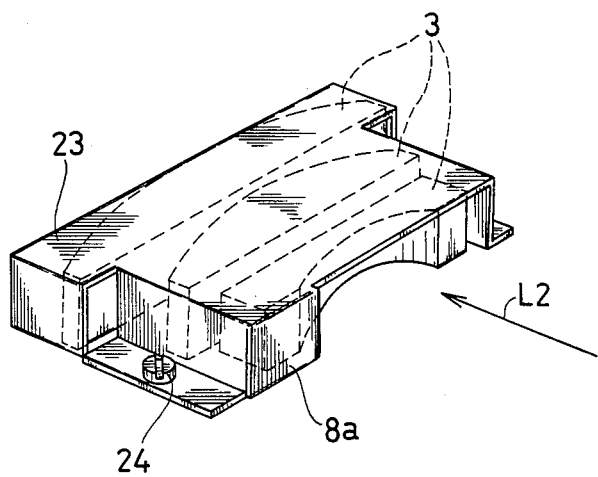
FIG. 5 is a perspective view showing another embodiment of the invention, i.e. a modification of the optical element of FIG. 2.

FIG. 5 is a perspective view showing another embodiment of the invention, wherein the image forming lens 3 shown in FIG. 2 is covered with a protective cover 23 made of aluminum plate. At the side of the lens 3 where the beam L2 is incident on the lens 3, a light blocking piece 8a is formed on the cover 23 integrally therewith and positioned in corresponding relation to the light blocking plate 8 shown in FIGS. 2 and 3. The cover 21 is fastened to the box 6 (FIG. 2) with screws 24. In this case, therefore, the light blocking piece 8a serves the function of the light blocking plate 8 of FIG. 3, with the result that the reflected light from the filter 5 forms no ghost image as in the foregoing embodiment.

The light blocking plate 8 can be replaced by an opaque adhesive tape affixed to the image forming lens 3 or by a paint coating formed on the lens 3. Further the light blocking plate 8 may be provided at the rear side of the image forming lens 3 (opposed to the filter 5) or at an intermediate portion between the lens 3 and the filter 5.

What is claimed is:

1. A laser beam printer comprising a beam source for emitting a beam corresponding to an image signal, a photosensitive member for forming an electrostatic latent image thereon with the beam, a polygon mirror for reflecting the beam emitted by the beam source to scan the photosensitive member with the beam, an image forming lens provided between the polygon mirror and the photosensitive member in the optical path of the mirror for focusing the reflected beam from the polygon mirror on the surface of the photosensitive member, a box accommodating the beam source, the polygon mirror, and the image forming lens therein and having a window for passing therethrough the beam from the image forming lens toward the photosensitive member, an optical filter provided over the opening of the window, and light blocking means disposed in an optical path along which a portion of the beam reflected from a first mirror face of the polygon mirror travels toward the image forming lens again after the beam portion reversely travels through the image forming lens upon reflection at the surface of the filter and is reflected from a second mirror face adjacent to said first mirror face, the light blocking means thereby preventing the beam portion, after it is reflected from the second mirror face, from striking the photosensitive member.

2. A laser beam printer as defined in claim 1 wherein the light blocking means is disposed at one end of the image forming lens at one side of the optical axis of the lens opposite to the other side thereof where the beam from the beam source is incident on the polygon mirror, is positioned in the vicinity of the surface of the image forming lens opposed to the polygon mirror, and is at a specified distance from the optical axis.

3. A laser beam printer as defined in claim 2 wherein the specified distance is Hy and is expressed by the following equation:

$$Hy \leqq 2f \cdot \theta - r \cdot \tan \theta \left[ \cos\left(\frac{\pi}{4} - \frac{\pi}{n} - \omega\right) - \right.$$

-continued $$\frac{1}{\sqrt{2}} \cos \frac{\pi}{n} \Bigg] + d \tan \left( \frac{4\pi}{n} - \frac{\pi}{2} + \theta \right) -$$

$$r \left[ \cos \left( \frac{\pi}{4} - \frac{\pi}{n} - \omega \right) - \frac{1}{\sqrt{2}} \cos \frac{\pi}{n} \right].$$

$$\tan \left( \frac{4\pi}{n} - \frac{\pi}{2} + \theta \right)$$

wherein:
$\theta$ is a minimum value satisfying $Gy \geq Ky$ wherein $$Gy = 2f\theta - r \tan \theta \left[ \cos \left( \frac{\pi}{4} - \frac{\pi}{n} - \omega \right) - \frac{1}{\sqrt{2}} \cos \frac{\pi}{n} \right], \text{ and}$$

$$Ky = \frac{r}{\sqrt{2}} \cos \frac{\pi}{n} - r \sin \left( \frac{\pi}{4} - \frac{\pi}{n} - \omega \right),$$

f: the focal distance of an f·$\theta$ lens for use as the image forming lens,
n: the number of mirror faces of the polygon mirror,
r: the radius of a circle circumscribing the polygon mirror,
d: the optical distance from the polygon mirror to the f·$\theta$ lens, and
$\omega = 2\theta$.

4. A laser beam printer as defined in claim 3 wherein n=6.

5. A laser beam printer as defined in claim 1 wherein the image forming lens is provided with a protective cover, and the light blocking means is formed integrally with the protective cover.

6. A laser beam printer comprising a beam source for emitting a beam corresponding to an image signal, a photosensitive member for forming an electrostatic latent image thereon with the beam, a polygon mirror for reflecting the beam emitted by the beam source to scan the photosensitive member with the beam, an image forming lens provided between the polygon mirror and the photosensitive member in the optical path of the mirror for focusing the reflected beam from the polygon mirror on the surface of the photosensitive member, a box accommodating the beam source, the polygon mirror, and the image forming lens therein and having a window for passing therethrough the beam from the image forming lens toward the photosensitive member, an optical filter provided over the opening of the window, and light blocking means that (a) is disposed in an optical path at one end of the image forming lens at one side of the optical axis of the lens opposite to the other side thereof where the beam from the beam source is incident on the polygon mirror, (b) is positioned in the vicinity of the surface of the image forming lens opposed to the polygon mirror, and (c) is at a specified distance Hy from the optical axis, where Hy is expressed by the following equation:

$$Hy \leq 2f \cdot \theta - r \cdot \tan \theta \left[ \cos \left( \frac{\pi}{4} - \frac{\pi}{n} - \omega \right) - \right.$$

$$\frac{1}{\sqrt{2}} \cos \frac{\pi}{n} \Bigg] + d \tan \left( \frac{4\pi}{n} - \frac{\pi}{2} + \theta \right) -$$

$$r \left[ \cos \left( \frac{\pi}{4} - \frac{\pi}{n} - \omega \right) - \frac{1}{\sqrt{2}} \cos \frac{\pi}{n} \right].$$

$$\tan \left( \frac{4\pi}{n} - \frac{\pi}{2} + \theta \right)$$

wherein:
$\theta$ is a minimum value satisfying $Gy \geq Ky$ wherein $$Gy = 2f\theta - r \tan \theta \left[ \cos \left( \frac{\pi}{4} - \frac{\pi}{n} - \omega \right) - \frac{1}{\sqrt{2}} \cos \frac{\pi}{n} \right], \text{ and}$$

$$Ky = \frac{r}{\sqrt{2}} \cos \frac{\pi}{n} - r \sin \left( \frac{\pi}{4} - \frac{\pi}{n} - \omega \right),$$

f = the focal distance of an f·$\theta$ lens for use as the image forming lens,
n = the number of mirror faces of the polygon mirror,
r = the radius of a circle circumscribing the polygon mirror,
d = the optical distance from the polygon mirror to the f·$\theta$ lens, and
$\delta = 2\theta$.

7. A laser beam printer as defined in claim 6 wherein n=6.

* * * * *